United States Patent
He et al.

(10) Patent No.: US 8,441,549 B2
(45) Date of Patent: May 14, 2013

(54) VIDEO ARTIFACT SUPPRESSION VIA ROLLING FLICKER DETECTION

(75) Inventors: Yi He, Issaquah, WA (US); Stuart William Milton, Woodinville, WA (US); Todd Nelson Schoepflin, Shoreline, WA (US); Andrew Juenger, Woodinville, WA (US); Roy Goh, Redmond, WA (US); Douglas L. Beck, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 365 days.

(21) Appl. No.: 12/825,101

(22) Filed: Jun. 28, 2010

(65) Prior Publication Data

US 2011/0187893 A1  Aug. 4, 2011

Related U.S. Application Data

(60) Provisional application No. 61/301,145, filed on Feb. 3, 2010.

(51) Int. Cl.
*H04N 9/73* (2006.01)
*H04N 5/00* (2006.01)

(52) U.S. Cl.
USPC .............. 348/226.1; 348/607; 348/619

(58) Field of Classification Search .......... 348/226.1, 348/227.1, 228.1, 607, 619
See application file for complete search history.

(56) References Cited

U.S. PATENT DOCUMENTS

| 6,710,818 B1 * | 3/2004 | Kasahara et al. ............ 348/607 |
| 2007/0153094 A1 * | 7/2007 | Noyes et al. ............... 348/226.1 |

* cited by examiner

*Primary Examiner* — Roberto Velez
*Assistant Examiner* — Joel Fosselman
(74) *Attorney, Agent, or Firm* — Alleman Hall McCoy Russell & Tuttle LLP

(57) ABSTRACT

A method for suppressing banding and rolling flicker in video acquired by a video camera. The method comprises acquiring a plurality of video frames and assessing an amount of rolling flicker in the plurality of video frames. The method further comprises configuring the video camera to quiet banding and rolling flicker responsive to periodic illumination at a first frequency if the amount of rolling flicker is above a threshold, and, configuring the video camera to quiet banding and rolling flicker responsive to periodic illumination at a second frequency if the amount of rolling flicker is below the threshold.

20 Claims, 3 Drawing Sheets

VIDEO ARTIFACT SUPPRESSION VIA ROLLING FLICKER DETECTION

This application claims priority to U.S. Provisional Application 61/301,145, filed Feb. 3, 2010 and entitled ROLLING FLICKER FREQUENCY DETECTION, the entirety of which is hereby incorporated by reference herein for all purposes.

BACKGROUND

A video camera such as a web cam may employ a detector array onto which a scene or subject may be imaged. The individual detectors of the array may be interrogated not all at once, but at different times during acquisition of a single frame of video. If the level of illumination of the scene or subject changes during the acquisition, the acquired video frames may appear unevenly illuminated. When the level of illumination changes periodically, the inhomogeneity may take the form of a banding pattern. This artifact is called 'static flicker' if the pattern position is fixed in the video frame. In some cases, the banding pattern will flicker through the series of frames of the video, changing position with each frame. This artifact is referred to as 'dynamic flicker' or 'rolling flicker'. Banding and rolling flicker can degrade the quality of video acquired under periodic illumination—such as illumination from fluorescent lamps and computer monitors, for example. However, when the level of the periodic illumination changes at a predictable frequency, it may be possible to configure the video camera to acquire video in manner that reduces or eliminates banding as well as rolling flicker.

SUMMARY

Therefore, in one embodiment, a method for suppressing banding and rolling flicker in video acquired by a video camera is provided. The method comprises acquiring a plurality of video frames and assessing an amount of rolling flicker in the plurality of video frames. The method further comprises configuring the video camera to quiet banding and rolling flicker responsive to periodic illumination at a first frequency if the amount of rolling flicker is above a threshold, and, configuring the video camera to quiet banding and rolling flicker responsive to periodic illumination at a second frequency if the amount of rolling flicker is below the threshold.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted herein.

DETAILED DESCRIPTION

Figure 1:
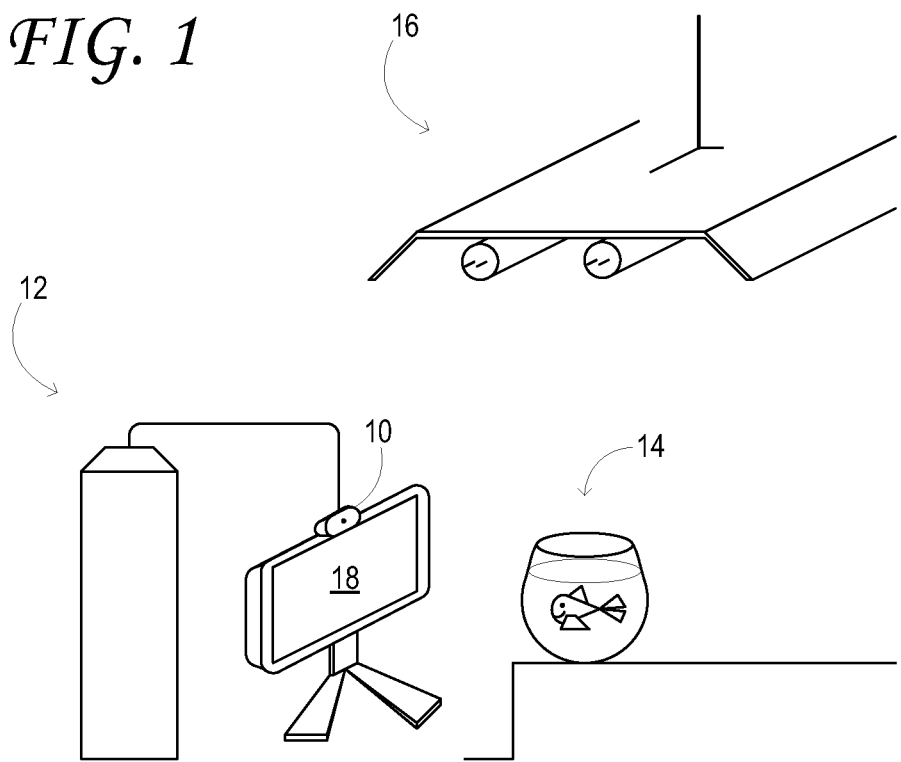
FIG. 1 schematically shows an example video camera arranged to image a scene or subject in accordance with an embodiment of this disclosure.

The subject matter of this disclosure is now described by way of example and with reference to certain illustrated embodiments. It will be noted that the drawing figures included in this disclosure are schematic and generally not drawn to scale. Rather, the various drawing scales, aspect ratios, and numbers of components shown in the figures may be purposely distorted to make selected features or relationships easier to see.

FIG. 1 schematically shows video camera 10 in one example embodiment. The video camera may be any device configured to capture video; it may be a handheld video camera, for example. In the embodiment illustrated in FIG. 1, however, the video camera is a webcam operatively coupled to computer system 12. The video camera is arranged to image scene 14, which may comprise one or more subjects. Accordingly, the scene or subject may be illuminated by various light sources. For example, the scene or subject may be illuminated at least in part by lamp 16 or at least in part by computer monitor 18. The lamp may be a fluorescent lamp powered by an alternating-current (AC) electrical source, such as a 50 Hz or 60 Hz AC source. As such, the intensity of the illumination delivered to the scene or subject may be modulated periodically (e.g., sinusoidally) at a frequency twice that of the AC electrical source—100 or 120 Hertz, for example. In this and other scenarios, the display screen of computer monitor 18 may undergo a periodic refresh event, which further exposes the scene or subject to periodic illumination.

Figure 2:
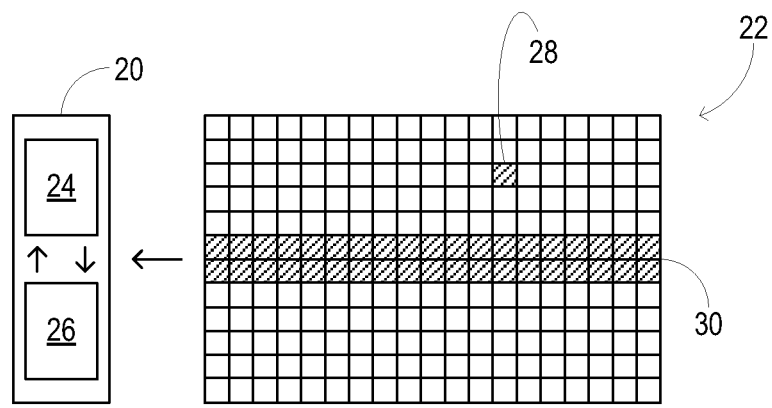
FIG. 2 schematically shows an example detector array of a video camera in accordance with an embodiment of this disclosure.

Video camera 10 includes a control system and a detector array, onto which an image of scene 14 may be focused. Accordingly, FIG. 2 schematically shows control system 20 and the detector array 22 in one example embodiment. To provide electronic control of video camera 10, control system 20 includes processor 24 operatively coupled to memory 26. The memory may be any suitable read-write or read-only memory. Accordingly, the memory may be configured to store instructions—e.g., firmware instructions—which, when executed by the processor, cause the processor to enact certain image-acquisition, image-processing and/or control functions of the video camera, including but not limited to the functions described herein.

As shown in FIG. 2, the various detectors 28 of detector array 22—photodiodes, CMOS sensors, etc.—are arranged in rows. Groups of one or more rows detectors are interrogated in sequence by the control system 20. One such group—group 30, for instance—may be interrogated during an integration period of duration IT, after which a different group is interrogated. Within control system 20, a complete image of the scene or subject may be assembled based on data from all of the groups interrogated.

Figure 3C:
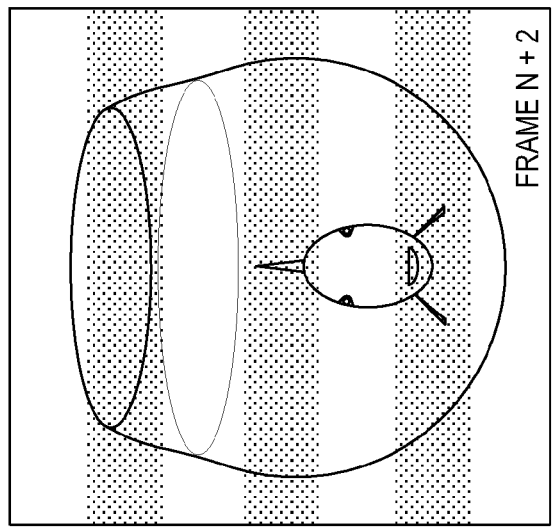
FIGS. 3A-3C show example captured images of a scene or subject in accordance with an embodiment of this disclosure.
Figure 3B:
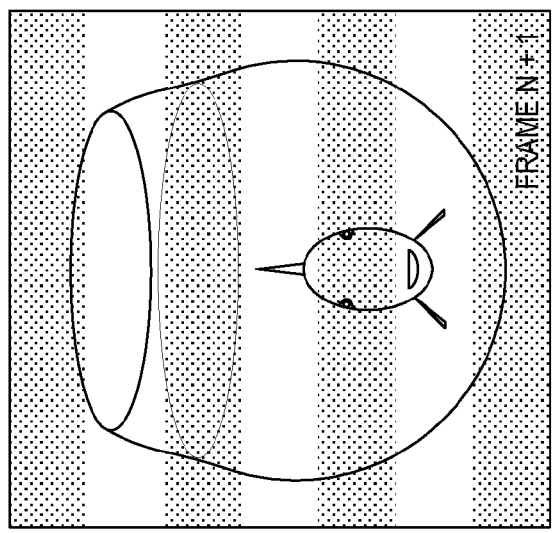
Figure 3A:
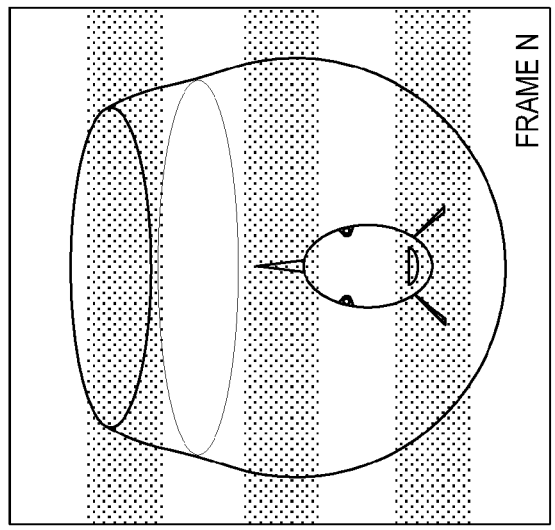

For desirable image fidelity, the amount of light delivered to the scene or subject should be the same during the integration periods of each group. Otherwise, the captured image may appear unevenly (i.e., inhomogeneously) illuminated. For instance, if the amount of light delivered to the scene or subject changes periodically, the captured image may exhibit an unexpectedly dark horizontal band, an unexpectedly bright horizontal band, or an alternating pattern of dark and light bands, as shown in FIG. 3A. Further, if a series of images of the same scene or subject is captured at regular intervals (i.e., a video), the banding pattern may appear to move through the series, resulting in a rolling flicker, as shown in FIGS. 3A through 3C.

Returning now to FIG. 1, the images of scene 14 captured by video camera 10 may be prone to banding and rolling flicker because of periodic illumination from lamp 16 and/or computer monitor 18. However, banding and rolling flicker will generally not occur when the integration time IT is an integer multiple of the period of the periodic illumination. If the period or frequency is known in advance of acquiring the video, it may be possible to adjust IT so that it equals an integer multiple of the period. However, the value of the period may differ from one location to the next, owing to different frequencies at which AC power is distributed globally and to the different refresh rates of computer monitors. In principle, it may be possible to rely on the user of the video camera to supply information via which the period can be predicted, thereby allowing appropriate adjustment of IT. However, this approach is prone to error and adds unwelcome complexity to using a video camera.

In view of the issues noted above, video camera 10 may be configured to ascertain the period or frequency of a periodic illumination incident upon a scene or subject and to automatically adjust the integration time to suppress banding and rolling flicker in the acquired video.

The example configurations described above enable various methods for suppressing banding and rolling flicker in video acquired by a video camera. Accordingly, some such methods are now described, by way of example, with continued reference to above configurations. It will be understood, however, that the methods here described, and others fully within the scope of this disclosure, may be enabled via other configurations as well.

Figure 4:
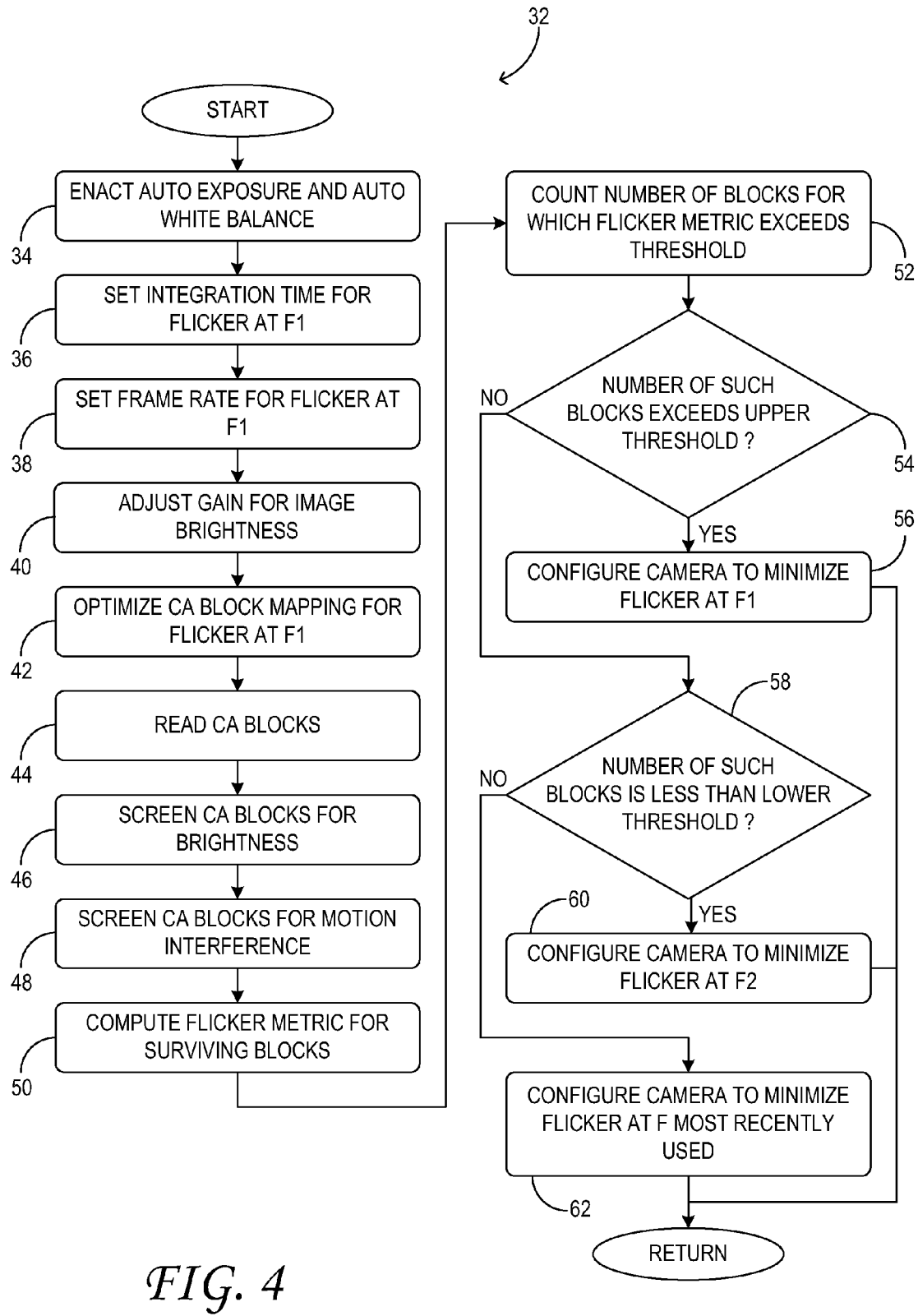
FIG. 4 illustrates an example method for suppressing banding and rolling flicker in video acquired by a video camera in accordance with an embodiment of this disclosure.

FIG. 4 illustrates an example method 32 for suppressing banding and rolling flicker in video acquired by a video camera. In one embodiment, the method may be encoded within the firmware memory of the video camera. In another embodiment, the method may be encoded in and executed by the video camera hardware—in an application-specific integrated circuit (ASIC), for example. In yet another embodiment, the method may be encoded in the video camera memory and executed by any suitable processor—a digital signal processor (DSP), for example. More generally, the methods disclosed herein may be enacted via any suitable combination of hardware, firmware or host post-processing. Irrespective of the particular processing strategy in use, method 32 may be invoked whenever video capture is initiated, or during video streaming.

Method 32 begins at 34, where auto exposure and auto white balance procedures of the video camera are enacted. These procedures may adjust video camera hardware and/or firmware based on the scene or subject being imaged and the lighting provided thereto. In particular, they may provide an initial gain setting for detector array 22 to optimize the accuracy of illumination frequency detection.

Method 32 then advances to 36, where the integration time IT is set to a value that will manifest rolling flicker to a much greater degree when the illumination frequency is a first frequency F1 than when the illumination frequency is a second frequency F2. Accordingly, IT may be set to an integer multiple of 1/F2 that is not an integer multiple of 1/F1. For example, an IT of 8.3 milliseconds (1/120 Hz) may be used for F1=100 Hz and F2=120 Hz. If the ambient light intensity is too low to provide adequate signal-to-noise (SNR) at this value of the integration time, a multiple value such as 16.7 milliseconds (2/120 Hz) may be used instead.

Method 32 then advances to 38, where the frame rate FR is set to a value that will manifest rolling flicker when the illumination frequency is a first frequency F1. Accordingly FR may be set to a frequency that does not divide remainderlessly into F1. For example, an FR of 30 frames per second (120 Hz/4) may be used for F1=100 Hz. If hardware constraints allow, FR may be set to a higher value such as 60 frames per second, such higher values resulting in reduced detection time by shortening the acquisition time (vide infra).

Method 32 then advances to 40, where the gain setting applied to the detector array of the video camera is adjusted for image brightness. In one embodiment, the gain may be adjusted to yield a mid-tone background—i.e., mid-range detector values across the image or region of interest within the image.

Method 32 then advances to 42. Here, the color accumulator (CA) block mapping of the video camera control system is adjusted to optimize rolling flicker detection according to the present method. Within each CA block, the video camera firmware calculates a weighted sum of all included pixels for the red (R), green (G), and blue (B) channels. In other embodiments, any one of these channels—the green channel, for instance—may be used alone for added computational efficiency. In still other embodiments, the CA blocks may be computed in the video camera hardware or processor, as noted hereinabove.

At this stage of the method, the CA block height (i.e., the height in pixels) may be set to half or less of the spatial period SP of the banding pattern that would result at the current value of the frame rate FR under periodic illumination at first frequency F1. Under these conditions, the spatial period is given by SP=FR×LPF/F1, where LPF is the number of lines per frame (vertical blanking included). Next, the CA block width may be set to any suitable value that results in a convenient total number of CA blocks spanning the image or the region of interest within the image. In one embodiment, the CA block width may be set to the same value as the CA block height. In another embodiment, the CA block width may be set to a value that will reveal the rolling flicker with minimal susceptibility to motion interference (vide infra). Next, the CA offset may be set to a value that results in at least one CA block being mapped to a region of the image where a moving subject is unlikely to be found, such as an edge or corner region of the image. This action provides some measure of protection against the present method being assailed by excessive motion interference. In one embodiment, a zero or near-zero CA offset will cause at least one CA block to include the upper left corner of the image, where, by inference, a moving subject is unlikely to be found.

The aspects of method 32 described to this point effectively pre-configure the video camera to manifest rolling flicker responsive to periodic illumination at the first frequency F1 and to quiet rolling flicker responsive to periodic illumination at the second frequency F2. In other embodiments equally contemplated, any or all of the above pre-configuring may be omitted. Instead, subsequent actions of the method may be enacted when the video camera has been set by a user to a state that manifests rolling flicker responsive to periodic illumination at F1 and that quiets rolling flicker responsive to periodic illumination at F2. In other words, the video camera may monitor user-determined settings such settings as frame rate and integration time, and initiate the subsequent actions when the criteria to manifest rolling flicker at F1 are satisfied. When the criteria are not satisfied, the method may be postponed. This variant offers an advantage of requiring no time lag or interruption in video streaming. In such embodiments, execution of the method may begin at 44, below.

Continuing in FIG. 4, at 44 at least some data from the CA blocks defined in the previous step is read for NF consecutive frames of video. The particular number of frames from which CA block data is read may be determined based on the assumed first illumination frequency F1 and the frame rate FR, in view of the Nyquist-Shannon sampling theorem. In brief, the frequency of the rolling flicker observed over a sequence of frames will correspond to an alias frequency when the frame rate is less than twice the illumination frequency, which is typically the case. For example, with periodic illumination at a first frequency F1 of 100 Hz and a frame rate FR of 30 frames per second, the lowest alias frequency is 10 Hz. To sample each phase of the 10 Hz alias and thereby reveal the rolling flicker, NF must be set to 30/10=3 or to some integer multiple thereof. Likewise, an appropriate value of NF can be determined for any combination of F1 and FR.

Method 32 then advances to 46, where each of the CA blocks read is screened for appropriate brightness. At this stage of the method, a block may be rejected from further processing because it is too bright or too dark. In principle, any of the accumulated channels of the CA block may be used for brightness screening. In one embodiment, channel Y (derived from the R, G, and B channels) may be used. CA blocks having a channel brightness greater than a too-bright threshold and CA blocks having a channel brightness lower than a too-dark threshold are rejected. The remaining blocks pass through the screen and are subject to further processing.

Method 32 then advances to 48, where the CA blocks surviving the brightness screen are further screened for motion interference. At this stage of the method, a motion-interference metric MIM is computed for each surviving block. In one embodiment, MIM is computed as follows. Let us assume that twelve consecutive frames have been captured, as described above. Let CA(M, N) denote a particular channel—e.g., the green color channel—of the $M^{th}$ CA block in the $N^{th}$ frame. Parameters D1, D2, and D3 are defined as $$D1=ABS(CA(M,4)-CA(M,1))+ABS(CA(M,7)-CA(M,4))+ABS(CA(M,10)-CA(M,7)),$$

$$D2=ABS(CA(M,5)-CA(M,2))+ABS(CA(M,8)-CA(M,5))+ABS(CA(M,11)-CA(M,8)),$$

$$D3=ABS(CA(M,6)-CA(M,3))+ABS(CA(M,9)-CA(M,6))+ABS(CA(M,12)-CA(M,9)).$$

Based on the aliasing mode identified above, these parameters will sum up the disturbance of CA values of identical phase for periodic illumination at 100 Hz. The motion-interference metric for the $M^{th}$ CA block over the sequence of acquired frames is then given by $$MIM(M)=D1+D2+D3.$$

At this stage of the method, a block may be rejected from further processing because it includes motion that would render the illumination frequency determination by the present method unreliable. Accordingly, CA blocks M for which MIM(M) is greater than a motion-interference threshold are rejected. The remaining blocks pass through the screen and are subject to further processing. In other embodiments, motion interference screening may be bypassed. For example, if the subject of the video capture is inferred or determined to exhibit relatively little motion, or very slow motion, all of the CA blocks that are read and that survive the brightness screen may be subject to further processing. In this case, a minimum of three captured video frames may be sufficient to enact the rolling flicker computation.

Continuing in FIG. 4, method 32 then advances to 50, where a rolling flicker metric FM is computed for each block passing through the above screens. In one embodiment, FM is computed as follows. Parameters P1, P2, and P3 are defined as $$P1=CA(M,1)+CA(M,4)+CA(M,7)+CA(M,10),$$

$$P2=CA(M,2)+CA(M,5)+CA(M,8)+CA(M,11),$$

$$P1=CA(M,3)+CA(M,6)+CA(M,9)+CA(M,12).$$

The rolling flicker metric is then defined as $$FM(M)=ABS(P1-P2)+ABS(P2-P3).$$

Thus, in the MIM calculation as well as the FM calculation, component parameters are derived from CA values of identical phase. Thus, parameters defined in this way provide coherent averaging for improved SNR. In this example, an illumination frequency of 100 Hz is again assumed.

In some embodiments, a useful lower limit may be set for the number of frames used in computing both MIM and FM metrics. In one particular embodiment, the useful lower limit may be set to a value of six.

Method 32 then advances to 52, where the total number of CA blocks M for which FM(M) exceeds a threshold value for rolling flicker are counted. It is then determined, at 54, whether the number of such blocks NB exceeds an upper threshold number. If the number of such blocks does exceed the upper threshold number, then it is determined that F1 is the illumination frequency, and at 56 the video camera firmware is configured to quiet banding and rolling flicker resulting from periodic illumination at first frequency F1. This action may, in one embodiment, comprise changing the integration time and frame rate of the video camera firmware relative to the values applied in 36 and 38. For example, the integration time may be set to an integer multiple of a reciprocal of the first frequency which is not an integer multiple of a reciprocal of the second frequency. Further, the frame rate may be set to a value that does not divide remainderlessly into the second frequency. However, if NB does not exceed the upper threshold number, then the method advances to 58. At 58 it is determined whether NB is less than a lower threshold number. If NB is less than the lower threshold number, then it is determined that F2 is the illumination frequency, and at 60 the video camera firmware is configured to quiet banding and rolling flicker resulting from periodic illumination at second frequency F2. This action may, in one embodiment, comprise retaining the integration time and frame rate of the video camera firmware relative at the values applied in 36 and 38.

To further improve the robustness of flicker frequency detection, the upper threshold may be greater than the lower threshold. In this case, it is possible for NB to be greater than the lower threshold but less than the upper threshold. In this unresolved scenario, method 32 arrives at 62, where the camera firmware is configured to quiet flicker resulting from periodic illumination at the most recent frequency F used for flicker suppression—a frequency determined in the present method, an overriding frequency commanded by the user, or a predetermined default frequency, for example.

It will be understood that the example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in an electronic control system.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems and methods described herein are exemplary in nature, and that these specific embodiments or examples are not to be considered in a limiting sense, because numerous variations are contemplated. Accordingly, this disclosure includes all novel and non-obvious combinations and sub-combinations of the various systems and methods disclosed herein, as well as any and all equivalents thereof.

The invention claimed is:

1. A method for suppressing banding and rolling flicker in video acquired by a video camera, the method comprising:
acquiring a plurality of video frames;
assessing an amount of rolling flicker in the plurality of video frames, wherein said assessing comprises computing a first metric responsive to rolling flicker for a first set of color-accumulator blocks of the video camera, and computing a second metric responsive to motion interference for a second set of color-accumulator blocks of the video camera;
configuring the video camera to quiet banding and rolling flicker responsive to periodic illumination at a first frequency if the amount of rolling flicker is above a first threshold, the first set excluding those color-accumulator blocks for which the second metric is below a second threshold; and
configuring the video camera to quiet banding and rolling flicker responsive to periodic illumination at a second frequency if the amount of rolling flicker is below the first threshold.

2. The method of claim 1 further comprising pre-configuring the video camera to manifest rolling flicker responsive to periodic illumination at the first frequency and to quiet rolling flicker responsive to periodic illumination at the second frequency.

3. The method of claim 2, wherein said pre-configuring comprises setting an integration time of the video camera to an integer multiple of a reciprocal of the second frequency, which is not an integer multiple of a reciprocal of the first frequency.

4. The method of claim 2, wherein said pre-configuring comprises setting a frame rate of the video camera to a value that does not divide remainderlessly into the first frequency.

5. The method of claim 2, wherein said pre-configuring comprises setting a color-accumulator block width of the video camera to a value that will reveal the rolling flicker with minimal susceptibility to motion interference.

6. The method of claim 2, wherein said pre-configuring comprises adjusting a color-accumulator offset of the video camera so that at least one color-accumulator block is mapped to an edge or corner region of the plurality of video frames, or to any region that will be minimally susceptible to motion interference.

7. The method of claim 2, wherein said pre-configuring comprises adjusting a gain setting of the video camera to yield a mid-tone background.

8. The method of claim 2, wherein said pre-configuring comprises setting a color-accumulator block height of the video camera to half or less of a spatial period of a banding pattern that would result at a current value of a frame rate of the video camera under periodic illumination at the first frequency.

9. The method of claim 8, wherein the spatial period is a product of the current value of the frame rate, times a number of lines per frame acquired by the video camera, divided by the first frequency.

10. The method of claim 1, wherein configuring the video camera to quiet the banding and rolling flicker responsive to periodic illumination at the first frequency includes:
setting an integration time of the video camera to an integer multiple of a reciprocal of the first frequency; and
wherein configuring the video camera to quiet the banding and rolling flicker responsive to periodic illumination at the second frequency includes setting the integration time of the video camera to an integer multiple of a reciprocal of the second frequency.

11. The method of claim 1, wherein the first threshold is an upper threshold, and wherein the method further comprises configuring the video camera to quiet banding and rolling flicker responsive to periodic illumination at a previously used frequency if the amount of rolling flicker is between the upper threshold and a lower threshold.

12. The method of claim 1 wherein said acquiring, assessing, and configuring are enacted when the video camera has been set by a user to a state that manifests rolling flicker responsive to periodic illumination at the first frequency and that quiets rolling flicker responsive to periodic illumination at the second frequency.

13. A method for suppressing banding and rolling flicker in video acquired by a video camera, the method comprising:
acquiring a plurality of video frames;
assessing an amount of rolling flicker in the plurality of video frames, wherein said assessing comprises computing a first metric responsive to rolling flicker for a first set of color-accumulator blocks of the video camera, and assessing a brightness for a second set of color-accumulator blocks;
configuring the video camera to quiet banding and rolling flicker responsive to periodic illumination at a first frequency if the amount of rolling flicker is above a first threshold, the first set excluding those color-accumulator blocks for which the brightness is below a third threshold; and
configuring the video camera to quiet banding and rolling flicker responsive to periodic illumination at a second frequency if the amount of rolling flicker is below the first threshold.

14. The method of claim 13 further comprising pre-configuring the video camera to manifest rolling flicker responsive to periodic illumination at the first frequency and to quiet rolling flicker responsive to periodic illumination at the second frequency.

15. The method of claim 14, wherein said pre-configuring comprises setting a frame rate of the video camera to a value that does not divide remainderlessly into the first frequency.

16. The method of claim 14, wherein said pre-configuring comprises setting a color-accumulator block width of the video camera to a value that will reveal the rolling flicker with minimal susceptibility to motion interference.

17. The method of claim 14, wherein said pre-configuring comprises adjusting a color-accumulator offset of the video camera so that at least one color-accumulator block is mapped to an edge or corner region of the plurality of video frames, or to any region that will be minimally susceptible to motion interference.

18. A method for suppressing banding and rolling flicker in video acquired by a video camera, the method comprising:
- setting an integration time of the video camera to an integer multiple of a reciprocal of a second frequency which is not an integer multiple of a reciprocal of a first frequency;
- acquiring a plurality of video frames;
- computing a first metric responsive to rolling flicker in the plurality of video frames for a first set of color-accumulator blocks of the video camera, the first metric increasing with an increasing absolute difference between a first sum of color-accumulator block values and a second sum of color-accumulator block values, wherein the first and second sums accumulate values of the same color-accumulator block in different video frames;
- setting the integration time of the video camera to an integer multiple of a reciprocal of the first frequency if the first metric is above a first threshold; and
- setting the integration time of the video camera to an integer multiple of a reciprocal of the second frequency if the first metric is below the first threshold.

19. The method of claim 18 further comprising computing a second metric responsive to motion interference for a second set of the color-accumulator blocks of the video camera, wherein the first set excludes those color-accumulator blocks for which the second metric is below a second threshold.

20. The method of claim 18, wherein the different video frames for which the first sum is accumulated correspond to video frames having the same phase with respect to periodic illumination at the first frequency.

* * * * *